(No Model.)
J. H. EMPSON.
MACHINE FOR COOKING CANNED GOODS.
No. 539,124. Patented May 14, 1895.
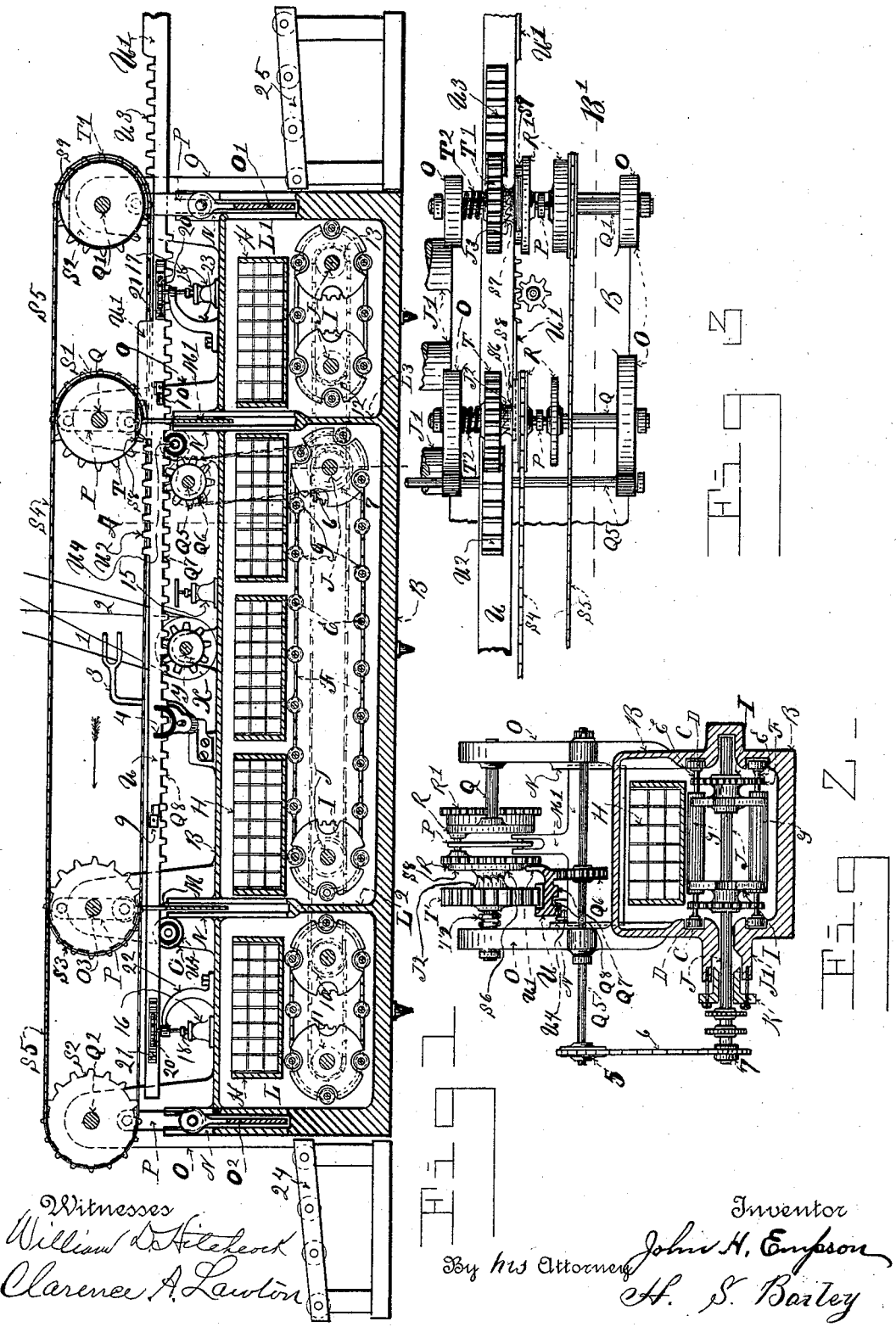
Witnesses
William D. Hitchcock
Clarence A. Lawton
Inventor
John H. Empson
By his Attorney
H. S. Boxley

UNITED STATES PATENT OFFICE.

JOHN HOWARD EMPSON, OF LONGMONT, COLORADO.

MACHINE FOR COOKING CANNED GOODS.

SPECIFICATION forming part of Letters Patent No. 539,124, dated May 14, 1895.

Application filed June 25, 1894. Serial No. 515,671. (No model.)

*To all whom it may concern:*

Be it known that I, JOHN HOWARD EMPSON, a citizen of the United States of America, residing at Longmont, in the county of Boulder and State of Colorado, have invented certain new and useful Improvements in Machines for Cooking Canned Goods; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in machines for cooking canned goods, and the objects of my invention are,—to provide a steam cooking machine in which the canned goods are mechanically fed through the cooking chamber without removing the steam pressure from the chamber either in placing them in the retort or chamber, or in taking them out, and of automatically controlling time of cooking.

In the present state of the art the process consists in placing the goods in chambers or retorts provided with lids which are steam tight, and then securely bolting them down and turning in steam. The goods are left in—depending on the pressure of steam or steam and water used, and upon their character—from two or three minutes to an hour or more. The steam has then to be exhausted from the chambers and the goods taken out; others again put in and the process repeated. It is obvious that this process of changing contents of the retorts is not only a tedious operation, but that it requires a large amount of steam to heat the retorts each time they are filled before cooking begins. In most factories a number of retorts are used and the operator at times makes mistakes and removes the contents of one retort when he should that of another. In this way many goods are spoiled, either from being cooked too much or not enough, and the quality of others seriously injured. By having them pass through a chamber in which the pressure and consequently the heat is regulated as desired, and the time is automatically controlled, no goods are spoiled from imperfect cooking and all are of a uniformly good quality. One kettle or retort only will be required for the largest factory, as the capacity is regulated by the length of it.

I attain the object of my invention by the mechanism illustrated and described in the accompanying drawings and specification, in which—

Figure 1 represents a longitudinal vertical section through the center of my improved automatic cooking machine on line B' of Fig. 3. Fig. 2 represents a fragmentary plan view of the same. Fig. 3 represents a cross-section on line A of Fig. 1.

Similar letters and figures refer to similar parts throughout the several views.

B designates a cooking chamber. It is preferably made of metal and is rectangular in cross-section. It is made steam tight, and its length is governed by the daily cooking capacity required, and may vary from forty to one hundred feet. In each vertical side wall I form guideways C. for the rollers D. These are journaled on the ends of cross-bars E. which extend at short intervals through the endless chains F. These cross-bars carry rollers G. on which rest the crates H. In these tanks I place the canned goods, and they are large enough to contain several hundred cans at a time.

The sprocket wheels I. are double wheels; that is, each hub has two disks or flanges, one for the chain and one for the rollers. The shafts J. extend through one side of the chamber, and each is provided with a suitable stuffing-box J' and gland K. At each end of said chamber I form separate compartments L. and L', dividing the chamber by the partial partitions $L^2$ and $L^3$, and intermittently I completely divide the two by valves M. and M', which are adapted to reciprocate vertically in guides N. formed in the chamber, and continued on the standards O. which are a part of the chamber. At each extreme end of said chamber I also arrange valves $O^2$ and O', similar to M. and M'. I also provide the end compartments with an endless chain platform and attachments similar to the one in the body of the chamber, but only of sufficient length to hold one of the crates at a time. These valves are connected by connecting rods P. to the crank shafts Q, Q' $Q^2$ and $Q^3$ mounted in the standards O, by attaching two disks to the ends of two pieces of shafting and connecting them together by a wrist pin. The crank-shafts $Q^2$ and $Q^3$ and sprocket wheels $S^2$ and $S^3$ are driven by sprocket teeth on the disks R and R' and chain belts $S^4$ and $S^5$ from the shafts Q and Q'. These disks R, R', $S^2$, and $S^3$ of the crank shafts are secured to their respective shafts, and R and R' are provided with clutches $S^6$ and $S^7$ on one side, and a stepped disk $S^8$ and $S^9$ formed integral with them.

Gears T and T' are loosely mounted on shafts Q and Q'. They are provided with clutches $J^2$ and $J^3$ adapted to engage with like clutches on the hubs of said sprocket wheels. The expansive springs $T^2$ are arranged on the crank shafts Q and Q' between the hub of the gear and the standard of the machine, and are adapted to hold the clutch of the gears in operative engagement with the clutches of the disk R and R'. The said gears mesh into a mutilated gear-rack U.

The teeth are arranged in groups $U^2$ and $U^3$ and intermediate of each group and in the path of the step disk a rib U', is formed above the body of the rack adapted to engage the said step and lock the sprocket wheels against rotative movement.

The rack is suitably mounted for reciprocative movement on roller guides $U^4$ attached to the standards forming a part of the chamber. The rack is provided with teeth on its under side which engage a gear X. This is secured to a shaft Y. which is journaled in a standard Z. forming part of the chamber B. This shaft carries a series of tight and loose pulleys which are connected by belts 1 and 2 to a similar series of pulleys on a countershaft. The belts are shifted by a rocking lever 3 and forked arm 4 which is operated by dogs 9 and 10 which are secured to the rack bar, the arrangement being a common method for reversing the movement of tables in metal planers, and machines of a similar character. The shaft $Q^5$ is properly journaled in the standards O of the chamber. It carries a gear $Q^6$ which is driven by a depending rack $Q^7$. This rack is arranged at one side of the driving teeth $Q^8$, of the rack bar. This rack corresponds in length with the intermittent movement of the platform in the cooking chamber, which is sufficient to move one of the tanks from one compartment to the other. The shaft $Q^5$ also carries a sprocket wheel 5, which is connected by a chain 6, to a similar sprocket wheel 7, secured to the shaft J. Similar wheels are arranged on the same shaft. These connect by chain to the wheels 10, 11, 12, and 13, and drive the endless roller platforms in the end compartments of the cooking chamber.

15 designates the steam inlet pipe, and 16 and 17 the exhaust pipes. In the exhaust pipes I arrange a valve 18, adapted to open and close automatically and intermittently by means of a gear 20 secured to its stem and arranged to mesh in teeth 21, formed on the side of the rack bar. The stem of the valve is supported by arms 22 and 23. A similar valve can be arranged in the steam inlet pipe to intermittently supply a volume of steam equal to that lost at each evolution of the operative mechanism, or the valve can be set to admit a steady flow of steam. At the ends of the chamber I arrange two platforms 24 and 25, to facilitate the ingress and egress of the tanks.

The operation is as follows: Steam is admitted through inlet pipes 15, to the chamber. The rack-bar travels back and forward by means of the reversing mechanism of the pulleys and belts 1 and 2, the backward motion being measurably slower than the forward. As the rack-bar moves forward in the direction of the arrow, the group of teeth $U^2$, engages the gear T. This gear being loosely mounted on the shaft Q., is moved laterally on the shaft by the spring $T^2$, which causes the clutch on its hub to engage the clutch on the hub of the disk R. Consequently the gear drives the sprocket wheel. The group of teeth rotates the gear and the sprocket wheel one half of a revolution, thereby raising the valve M. and consequently the valve M', which is operatively connected to the shaft Q., by sprocket wheels and chains S', $S^3$ and $S^4$. This one half revolution brings the step $S^8$ of the disk part of the ratchet wheel into engagement with the rib U', thereby locking the ratchet wheel against rotation. The instant the valves reach in their upward movement the level of the top of the crates, the pendent teeth $Q^7$ engage the gear $Q^6$ which through the medium of the sprocket wheels and chains operatively connected to the shaft $Q^5$, and J, causes the endless platforms in the cooking chamber to move the necessary distance to transpose one of the crates H from the main compartment of the chamber to the end compartment, and the crate in the compartment L' to the body of the chamber, and at the same time all the crates are moved forward in successive order. When the valves M. and M' are open, the steam escapes and fills the compartments at the ends which are closed tightly by the valves O' and $O^2$. The instant the rib leaves the step of the sprocket wheel the valves drop back of their own weight, closing the main compartment of the chamber. Immediately the teeth 21 formed on the side of the rack-bar engage the gears of the valve stems, thereby opening the exhaust outlets, which frees the end compartments L and L' of the steam. The group of teeth $U^3$ of the rack-bar then engages the gear T', which locks to the disk R' in a similar manner as the gear T and disk R of the valve M which gives the crank-shaft Q' a half revolution, thereby opening the valves O' and $O^2$, they being connected by sprocket wheels and chains $S^2$ and $S^5$ and sprocket teeth on the disk R'. These valves are held open in a similar manner to the valves M and M' and close when the rib $U^3$ leaves the step portion of the disk R' by their own weight. They are held open by the rib long enough to manually remove the crate in the rear compartment L and to insert a new crate in the compartment L'. As soon as the end valves drop the dog 9 contacts with the rocking lever 4, which shifts the belts, causing the rack-bar to reverse its movement. The backward movement of the bar is much slower than the forward movement, depending largely on the capacity of the chamber. The instant the rack reverses, the clutch of the gear disengages from the disk clutch. The angle given the clutch teeth causes them to separate when the gear is reversed if the disk is held stationary. As the weight of the valve and shaft is greater than the expansive power of the spring, the gears move away from the disks, and as the backward movement of the rack is very slow, it does no harm to have the gear slide around on the teeth of the disk clutches.

If the chamber holds twenty crates and the time required to cook the goods is twenty minutes, the mechanism must make one revolution each minute in order to successively feed a tank through the chamber in that time.

The time required for each revolution of the operating mechanism is confined to a very few seconds. Consequently the machinery should be arranged to operate the valves and carrying mechanism intermittently and at predetermined periods of time varying with the kind of goods being cooked.

The mechanism for attaining the different periods of time required to cook the various kinds of goods may consist of speed cones, one of which may be arranged on a countershaft, and the other on a power driven shaft; or it may consist of a pair of worm wheels and bevel gears with a pair of step cones for driving the worm and bevel gear mechanism. These are not shown as there are a number of mechanical arrangements which will produce the required results; but whatever mechanism I adopt for this purpose I should arrange it on a countershaft and the power driven shaft so that I could retain the valve operating the crate and conveying mechanism as herein illustrated. I do not however, wish to confine myself to the mechanism herein illustrated and described for automatically opening and closing the valves, or for intermittently forwarding the goods through the chamber, but claim the right to use any mechanism that will perform the work.

My invention covers more particularly the cooking of canned goods by automatically passing them successively through a cooking fluid confined and regulated in a suitable chamber, at predetermined periods of time.

Having described my invention, what I claim as new, and desire to secure by Letters Patent, is—

1. An automatic cooking machine comprising the following instrumentalities: a steam charged chamber provided with inlet and outlet valves adapted for the ingress and egress of the goods; valves arranged intermediate of said ingress and egress valves, and adapted to divide said chamber into compartments; movable platforms or belts arranged in each compartment and adapted to carry the canned goods in suitable receptacles, and means for automatically operating the said valves and carrying belts, for the purpose herein set forth and described.

2. An automatic cooking machine comprising a steam charged cylinder provided with end inlet and outlet valves, and valves intermediate the said end valves adapted to form compartments at each end of said chamber; endless traveling belts adapted to receive the goods in suitable receptacles and arranged in each compartment thus formed, to successively transpose the said receptacles from one compartment to another and means substantially as herein described for operating the said valves and conveying mechanism, as specified.

3. The combination in an automatic cooking machine of a steam charged chamber divided into compartments by valves arranged to divide said chamber and adapted to intermittently and automatically confine within them, crates containing canned goods; a movable endless carrier arranged in each compartment and operatively connected together to move synchronously a predetermined distance, whereby the said crates may be intermittently and successively fed through said steam charged chamber and means for automatically operating said valves and said conveying mechanism, as herein specified.

4. In a machine for automatically cooking canned goods, a steam tight chamber, compartments formed therein and separated from one another by valves, an endless movable platform journaled in each division and rotatively connected with one another, suitable receptacles in which to place the canned goods adapted to said platform and compartments, and means for opening and closing said valve, and for moving the platforms at predetermined periods of time.

5. In a machine for cooking canned goods, a non-leakable chamber provided with compartments divided by partial partitions and by vertical guide ways for the valves adjacent to the partition and extending in standards above the body of the chamber, a crank shaft journaled in said standards, rods connecting the valves to said crank shaft, and means for intermittently opening and closing said valves at predetermined periods of time, as set forth.

6. The combination with a cooking chamber divided into compartments, endless grooved guide-ways oppositely disposed in the side of each compartment, an endless conveyer at each end of the cylinder in engagement with said ways, sprocket wheels journaled in each end of each compartment and carrying said conveyer, shafts supporting said sprocket wheels, one of which in each compartment extends through said chamber, a gland and stuffing box on said chamber around each shaft, sprocket wheels and chains connecting the external portions of said shafts operatively together, and means for periodically and progressively rotating said endless conveyers, for the purpose herein set forth and described.

7. The combination in a steam cooking machine, a rectangular chamber divided into three compartments by partial partitions and automatic actuating valves connecting therewith endless rotative platforms in each division, crates for holding canned goods adapted to said platforms, shafts adapted to rotatively support said endless platforms journaled in each end of each compartment, one of which in each division passes out of the chamber through a stuffing box and glands, rotative mutual power connections between the exposed ends of said shafts, partial end partitions and automatic actuating valves closing the ends of said chamber, disk crank shafts transversely journaled above said chamber, and connected to said valves, a reciprocating, mutilated rack-bar having groups of teeth thereon, arranged longitudinally over said chamber, gears loosely mounted on one of the end, and on one of the intermediate crank shafts, mutual engaging clutches formed partially on said gear and partially on said crank disks, rotative power connection between said power crank shaft, and the crank shafts at opposite ends of said cylinder, a step on the power receiving crank disks, a slide rail on said rack-bar adapted to engage said step and lock said crank-shafts, depending gear teeth on said rack-bar, a shaft journaled in standards supporting said gear, and a sprocket wheel and chain connection between said shaft and the rotary platform shafts, and means for reciprocating said rack-bar at predetermined intervals of time, and means for imparting differential speed to said rack-bar when moving in opposite directions, the combination operating to periodically open and close said valves, and to progressively feed said can containing tanks automatically through the cooking chamber, as specified.

8. The combination in a cooking machine, of a chamber divided into three compartments by automatic actuated valves, rotative endless conveyers in each compartment arranged to progressively feed the cooking articles from one compartment to the other, vertical reciprocating valves arranged to open and close the compartments from one another, crank-shafts operatively connected to said valves, means for imparting a partial rotative motion to said shafts, whereby said valves may be opened, and means for holding said valves open while the canned goods are carried forward a predetermined distance, and from one compartment to another by the conveying platform means for opening and closing the intermediate valve synchronously, and also the end valves, but at different periods of time, steam inlet and exhaust pipes in the said compartments and automatically actuated valves arranged to control the flow and pressure of the cooking fluid, substantially as described.

In testimony whereof I affix my signature in presence of two witnesses.

JOHN HOWARD EMPSON.

Witnesses:
WILLIAM D. HITCHCOCK,
CLARENCE A. LAWTON.